United States Patent [19]

Hiromitsu

[11] 4,213,084
[45] Jul. 15, 1980

[54] VARIABLE LEAKAGE TRANSFORMER

[75] Inventor: Hirayama Hiromitsu, Funabashi, Japan

[73] Assignee: TDK Electronics Co., Ltd., Tokyo, Japan

[21] Appl. No.: 884,953

[22] Filed: Mar. 9, 1978

[30] Foreign Application Priority Data

May 20, 1977 [JP] Japan .................................. 52-57749
May 26, 1977 [JP] Japan .............................. 52-66946[U]
Jun. 30, 1977 [JP] Japan .............................. 52-85426[U]

[51] Int. Cl.² ....................... H01F 29/10; H01F 29/12
[52] U.S. Cl. ....................................... 323/56; 336/120; 336/160; 363/91
[58] Field of Search .................... 323/48, 56; 336/120, 336/132

[56] References Cited

U.S. PATENT DOCUMENTS

| | | | |
|---|---|---|---|
| 1,376,978 | 5/1921 | Stoekle | 323/56 |
| 2,383,460 | 8/1945 | Purves et al. | 336/120 X |
| 2,975,358 | 3/1961 | Ashman et al. | 336/120 X |
| 3,087,108 | 4/1963 | Toffolo et al. | 323/56 |
| 3,183,429 | 5/1965 | Baycura et al. | 323/56 X |
| 3,185,917 | 5/1965 | Owen | 323/48 X |
| 3,188,552 | 6/1965 | Owen | 323/56 X |
| 3,679,966 | 7/1972 | Wanlass | 323/56 |

Primary Examiner—A. D. Pellinen
Attorney, Agent, or Firm—Burgess, Ryan and Wayne

[57] ABSTRACT

A variable leakage transformer or a variable voltage transformer comprising a magnetic core with a main magnetic path and a sub-magnetic path, the main magnetic path having at least a common magnetic path with the sub-magnetic path, a primary winding wound on said common magnetic path of the core, a secondary winding wound on said main magnetic path of the core, and means for controlling the magnetic flux in said sub-magnetic path. By controlling the magnetic flux in the sub-magnetic path, the leakage of the flux induced by the primary winding from the main magnetic path to the sub-magnetic path can be controlled, thus the coupling between the primary and secondary windings, and conduction period in each cycle of the AC output voltage are controlled. The control of the conduction period in each cycle provides the control of the power transmitted from the primary winding to the secondary winding.

1 Claim, 22 Drawing Figures

Fig. 1
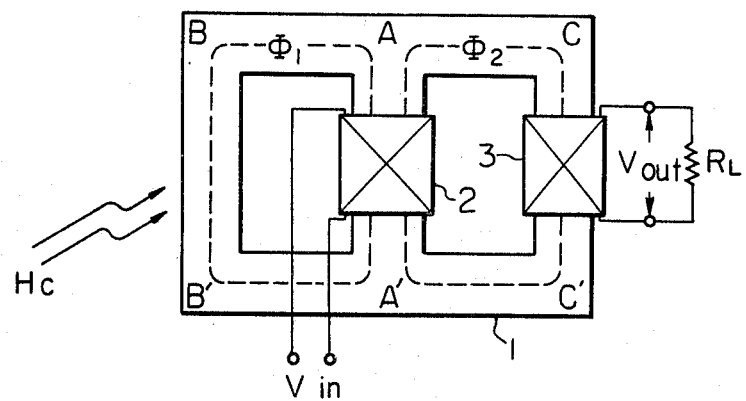
Fig. 2(A) V in
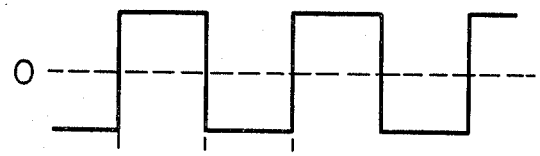
Fig. 2(B) V out
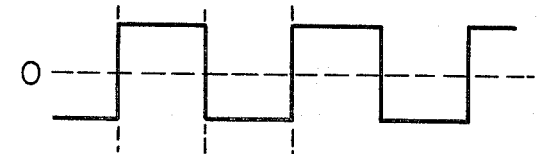
Fig. 2(C) V out
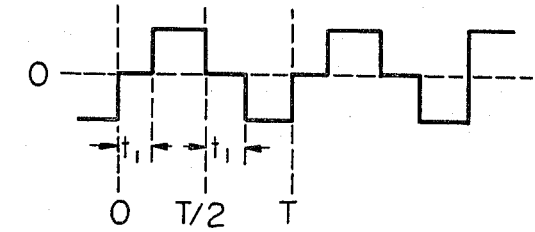

Fig. 3(A) V in 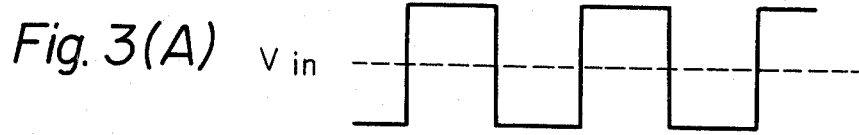
Fig. 3(B) V out 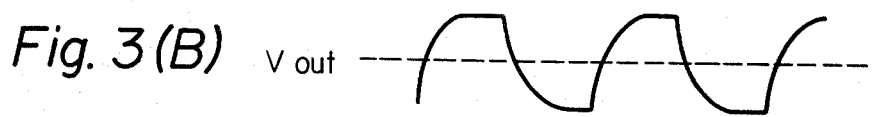
Fig. 4
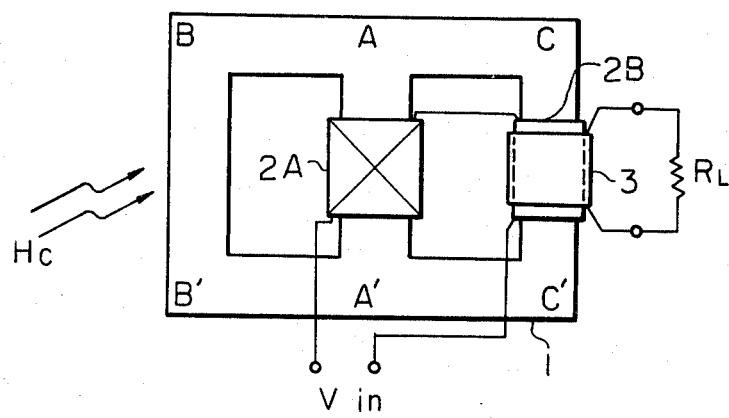

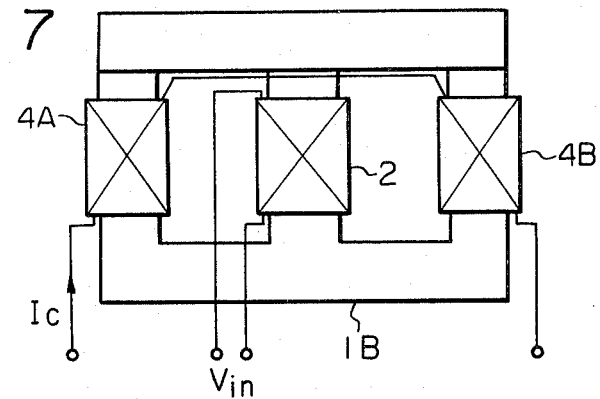
Fig. 7
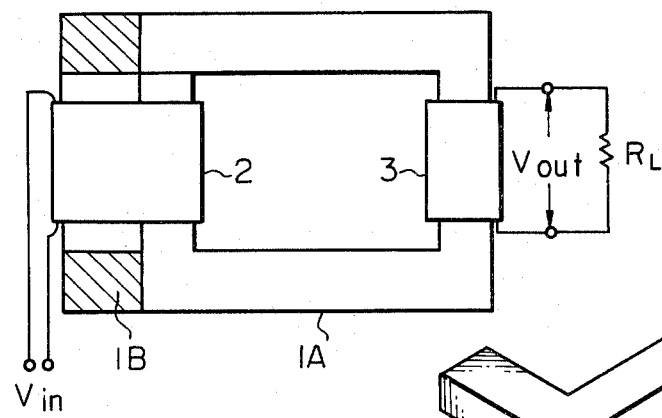
Fig. 8
Fig. 9
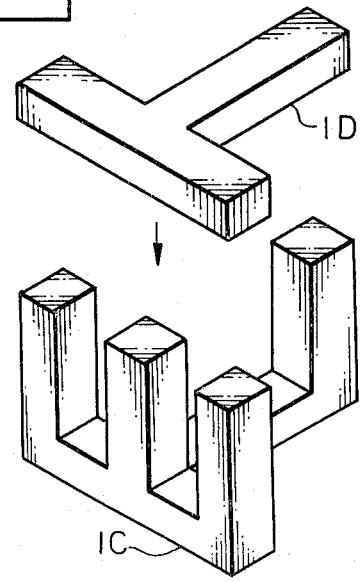

VARIABLE LEAKAGE TRANSFORMER

BACKGROUND OF THE INVENTION

The present invention concerns the structure and application of a variable leakage transformer or a variable voltage transformer.

A transformer has, in general, a magnetic core having a closed magnetic path, a primary and secondary windings wound on said magnetic core, and all the input power applied to the primary winding is provided at the output of the secondary winding except for a small amount of loss in the transformer. In this case, the output voltage $V_2$ across the secondary winding is $$V_2 = (n_2/n_1) \times V_1,$$

where $V_1$ is the voltage across the primary winding and $n_1$ and $n_2$ are the number of windings of the primary and secondary windings, respectively.

When we want to control the output power of the transformer, a controlable switching device such as a SCR (Silicon Controlled Rectifier) or a transistor must be employed at the output of the transformer. In said controlable switching device, the pulse width during each cycle is varied by controlling the conducting time of the switching element (SCR). However, a prior controllable switching device has the disadvantage that the circuit is very complicated and the price of the device is rather high.

Another prior art device for controlling an AC power source is a magnetic amplifier, in which a saturable reactor is inserted between the power source and the load, and by controlling the reactor, the power transferred from the source to the load is controlled. However, a magnetic amplifier has the disadvantage that the voltage across the load must be the same as that of the power source, and the saturable reactor does not function as a variable-voltage transformer.

SUMMARY OF THE INVENTION

It is an object of the present invention, therefore, to overcome the disadvantages and limitations of prior art transformers by providing a new and improved controllable transformer which operates on the principle of leakage flux control.

It is also an object of the present invention to provide a new and improved stabilized power source using the present transformer.

The above and other objects are attained by a variable leakage transformer comprising a magnetic core with a main magnetic path and a sub-magnetic path, the main magnetic path having at least a common magnetic path with the sub-magnetic path, a primary winding wound on said common magnetic path, a secondary winding wound on said main magnetic path, and means for controlling the magnetic flux in said sub-magnetic path.

Preferably, the magnetic flux in said sub-magnetic path is controlled by the direct current in the control winding wound on said sub-magnetic path.

In the particular application of the present transformer for a stabilized power source, the direct current in said control winding reflects the change of the output voltage across the secondary winding.

Preferably, the structure of said magnetic core has at least three closed magnetic core pieces each of which is rotatably mounted around the axis of the leg on which the primary winding is wound.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is the cross sectional view of the present transformer,

FIG. 2(A), FIG. 2(B) and FIG. 2(C) show the operational waveforms of the transformer in FIG. 1, FIG 3(A) and FIG. 3(B) show the other operational waveforms of the transformer in FIG. 1, FIG. 4 is the cross sectional view of another embodiment of the present transformer, FIG. 7 is the plan view of the transformer in FIG. 6, FIG. 8 is the side view of the transformer in FIG. 6, FIG. 9 shows the structure of the core for the use of the transformer in FIG. 6.

DESCRIPTION OF THE PREFERRED EMBODIMENTS

Figure 5:
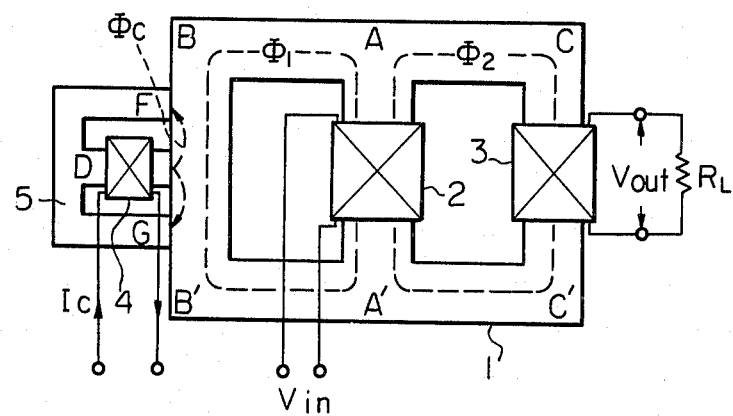
FIG. 5 is the cross sectional view of another embodiment of the present transformer.

FIG. 1 shows the first embodiment, depicting a configuration based on the principle of this invention. In this figure, the magnetic core 1, composed of the combination of either the E shaped core and I shaped cores or a pair of E shaped magnetic cores, is a three legged magnetic core having 2 magnetic paths, a sub-magnetic path AA'B'B and a main magnetic path AA'C'C. The middle leg AA' and the side leg CC' of the magnetic core 1 are provided with the primary coil 2 and secondary coil 3, respectively. The number of turns of the primary coil 2 is assumed to be $N_1$ and that of the secondary coil $N_2$.

Now, the load resistor $R_L$ is connected to the secondary coil 3 and AC (Alternate Current) input voltage $V_{in}$ is applied to the primary coil 2. The magnetic flux $\phi$ generated thereby is divided into the magnetic flux $\phi_1$ that surrounds the sub-magnetic path AA'B'B, and the magnetic flux $\phi_2$ that surrounds the main magnetic path AA'C'C. That is, the formula $\phi = \phi_1 + \phi_2$ is satisfied. Of these two fluxes, the one that supplies power to the load resistor $R_L$ is the one that interlinks with the secondary coil 3, i.e. $\phi_2$. The $\phi_1$ does not contribute power supply to the load resistor $R_L$. At this stage, if the magnetic reluctance is increased by application of the control magnetic field $H_c$ to the sub-magnetic path AA'B'B from outside, the magnetic flux $\phi_1$ decreases with resultant proportionate increases in the magnetic flux $\phi_2$. Therefore, the output voltage $V_{out}$ of the secondary coil 3, i.e. the power supplied to the load resistor $R_L$, increases. Eventually, it can be seen that power transferred from the primary to the secondary can be controlled by changing the strength of magnetic field through application of the control magnetic field $H_c$ to the sub-magnetic path AA'B'B from outside.

Suppose that a rectangular wave voltage is applied as input voltage $V_{in}$ such as given in FIG. 2(A), if the sub-magnetic path AA'B'B is in a perfectly saturated condition in the control magnetic field $H_c$, because this sub-magnetic path is considered to be equivalent to non-existent as a magnetic circuit, the output wave form of the output voltage $V_{out}$ thus obtained is identical with that of the input voltage $V_{in}$ shown in FIG. 2(B). The amplitude is determined by the ratio between the number of turns $N_1$ on the primary coil 2 and the number of turns $N_2$ on the secondary coil 3. That is, $V_{out} = -V_{in}(N_2/N_1)$.

Suppose that the sub-magnetic path AA'B'B is put in a non-saturated condition by weakening the control magnetic field $H_c$, some of the magnetic flux $\phi$ generated by input voltage $V_{in}$ flows to the sub-magnetic path during the time $t_1$ i.e. from the time the input voltage $V_{in}$ is applied until the time the sub-magnetic path AA'B'B is saturated by the input voltage $V_{in}$. Then, the output voltage $V_{out}$ in effect becomes almost zero.

After a period of time $t_1$, the sub-magnetic path AA'B'B becomes saturated. This saturated condition is maintained until inversion of the input voltage $V_{in}$. Therefore, as given in FIG. 2(C) the output voltage $V_{out}$ ($=V_{in}N_2/N_1$) appears only during the time $(T/2 - t_1)$. At this stage, the length of time $t_1$ can be changed by changing the magnetized condition of the sub-magnetic path AA'B'B, or in other words by the magnitude of the control magnetic field $H_c$ applied to the sub-magnetic path AA'B'B.

Thus, by increasing or decreasing the magnitude of the control magnetic field $H_c$, the pulse width of output voltage $V_{out}$ can be controlled. During the time $t_1$, power consumption in the primary winding is zero, because the magnetic flux $\phi$ surrounds the sub-magnetic path AA'B'B and does not interlink with the secondary coil 3, and therefore, the load as viewed from the primary coil 2 is in a condition equivalent to open circuit. In other words, the control does not affect power efficiency and the operation is always highly efficient.

Performance of this first embodiment shows that the pulse width of the output voltage $V_{out}$ can be efficiently controlled by increasing or decreasing the magnitude of the control magnetic field $H_c$.

It should be appreciated of course that an input voltage of sinusoidal waveform is also applicable and provides the same effect as a rectangular waveform, although the embodiment shows the rectangular waveform for the sake of simplicity of the explanation.

As explained above, according to the present invention, the leakage of the magnetic flux from the main magnetic path to the sub-magnetic path can be controlled by varying the magnetic flux in the sub-magnetic path, and thus, the coupling between the primary and secondary windings and the conduction period in each cycle of the input voltage are controlled. And it should be noted that the control of the conduction period provides the control of the power transmission from the primary winding to the secondary winding.

In the above embodiment, the primary coil 2 was wound around the middle leg of the magnetic core 1 and the secondary coil 3 was wound around one of the side legs. As a result of this arrangement, the magnetic coupling between the primary coil 2 and the secondary coil 3 has a tendency to be insufficient. If the coupling is insufficient, even if the rectangular wave input voltage $V_{in}$ as given in FIG. 3(A) is applied, the wave form of the output voltage $V_{out}$ becomes deformed as shown in FIG. 3(B). This results from insufficient coupling between the primary coil 2 and the secondary coil 3.

FIG. 4 depicts the second embodiment which provides a configuration with improvements on the above mentioned drawback. In this Figure, the primary coil is divided into the first primary coil 2A and the second primary coil 2B. The first primary coil 2A surrounds the middle leg AA' of the magnetic core 1 and the second primary coil 2B surrounds the side leg CC'. The secondary coil 3 is also wound over the second primary coil 2B. With this arrangement, the coupling between the primary and the secondary coils becomes sufficient and the wave form of the output voltage $V_{out}$ and that of the input voltage $V_{in}$ can be made almost identical.

FIG. 5 illustrates the 3rd embodiment. In this figure, the middle leg AA' of the magnetic core 1 is provided with the primary coil 2, and the side leg CC' with the secondary coil 3. At the same time, the other side leg BB' is provided with the control magnetic core 5 surrounded by the control coil 4. The control magnetic core 5 is an E shaped magnetic core with its middle leg D designed to be surrounded by the control coil 4.

In the above arrangement, passage of the control current $I_c$ through the control coil 4, causes the generation of a control magnetic field on the control coil 4. This in turn generates: (1) a control magnetic flux $\phi$ that passes through the middle leg D of the control magnetic core 5, the side leg BB' of the magnetic core 1 and to the side leg F of the control magnetic core 5; and (2) a control magnetic flux $\phi_c$ that passes through the middle leg D, side leg BB' and to the side leg G. At this stage, if the control current $I_c$ is increased or decreased, the control magnetic flux $\phi_c$ also increases or decreases proportionally. Therefore, if the control current $I_c$ is increased, the magnetic reluctance of the sub-magnetic path AA'B'B increases and the resultant condition is susceptible to magnetic saturation. Therefore, if rectangular waves such as shown in FIG. 2(A) are applied as input voltage $V_{in}$, part of the sub-magnetic path AA'B'B is saturated in a short time with less magnetic flux $\phi_1$. Consequently, the time $t_1$ indicated in FIG. 2(C) becomes short, while the pulse width of output voltage $V_{out}$ becomes long. Conversely, if control current $I_c$ is decreased, magnetic reluctance of the sub-magnetic path AA'B'B becomes small and possibility of magnetic saturation becomes remote. Then, it will take time to saturate part of the sub-magnetic path. Consequently, the time $t_1$ shown in FIG. 2(C) becomes long and the pulse width of output voltage $V_{out}$ is shortened.

The third embodiment in FIG. 5 is capable of controlling pulse width of the output voltage $V_{out}$ very efficiently through increase or decrease of control current $I_c$. Consequently, the power transferred to the load resistor $R_L$ from the input can be electrically controlled. The fact is that the direction of the magnetic flux $\phi_1$ surrounding the sub-magnetic path AA'B'B is inverted following the input voltage $V_{in}$. However, since control magnetic flux $\phi_c$ is constantly flowing in both directions, either one of the magnetic fluxes $\phi_c$ and the magnetic flux $\phi_1$ always join together and cause the magnetic saturation. Therefore, control current $I_c$ can be direct current and is readily controllable.

Figure 6:
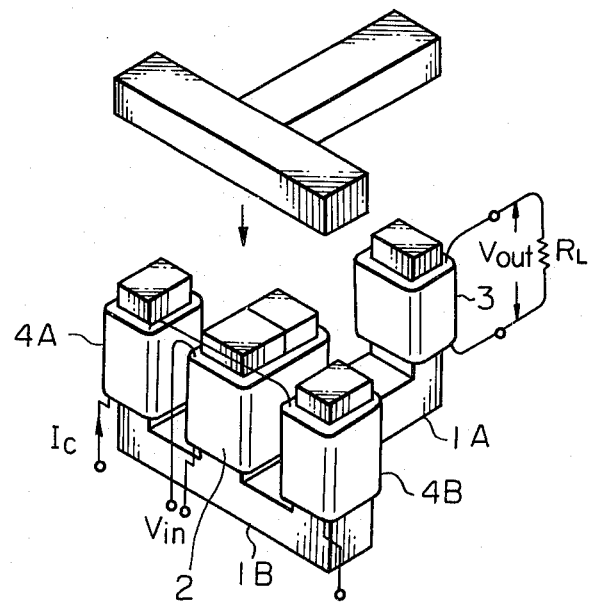
FIG. 6 is the perspective view of still another embodiment of the present transformer.

FIGS. 6, 7 and 8 illustrate the fourth embodiment. In these figures, the magnetic core 1A forming the main magnetic path is made up of the combination of the U shaped core and the I shaped core, and the magnetic core 1B forming the sub-magnetic path is made up of the combination of the E shaped core and the I shaped core. And, the primary coil 2 is wound in commond around one of the legs of the magnetic core 1A and the middle leg of the magnetic core 1B while the secondary coil 3 is wound around the other leg of the magnetic core 1A. Both the side legs of the magnetic core 1B are provided with the control coils 4A and 4B. The control coils 4A and 4B are connected in series so that the voltages induced in these coils will cancel each other when the input voltage $V_{in}$ is applied to the primary coil 2.

According to the above arrangement, the magnetized condition of the magnetic core 1B forming the sub-magnetic path can be changed by the control current $I_c$ fed to the control coils 4A and 4B. That is, when the rectangular wave such as shown in FIG. 2(A) is applied as input voltage $V_{in}$, the magnetization strength of the sub-magnetic path becomes large if control current $I_c$ is large, while the time $t_1$ in FIG. 2(C) becomes short. If the control current $I_c$ is small, the strength of magnetization of the sub-magnetic path becomes weak while the time $t_1$ becomes long. As a result, pulse width of output voltage $V_{out}$ can be controlled.

In the fourth embodiment in FIG. 6 the magnetic core is made up of the EI magnetic core and the UI magnetic core combined. However, it should be appreciated that a magnetic core having the same effect may be formed by a combination of the four-legged mangetic core IC and the T shape magnetic core ID as depicted in FIG. 9.

Although FIG. 6 disclosed the embodiment using U-I core and E-I core, it should be appreciated of course that many modifications of FIG. 6, for instance the embodiment using U—U core and E—E core, are possible.

In the third and fourth embodiment shown in FIG. 5 and 6, the wave form of output voltage $V_{out}$ can be improved by dividing the primary coil 2 as demonstrated in the second embodiment and by closely coupling a part of the primary coil to the secondary coil 3.

Figure 10:
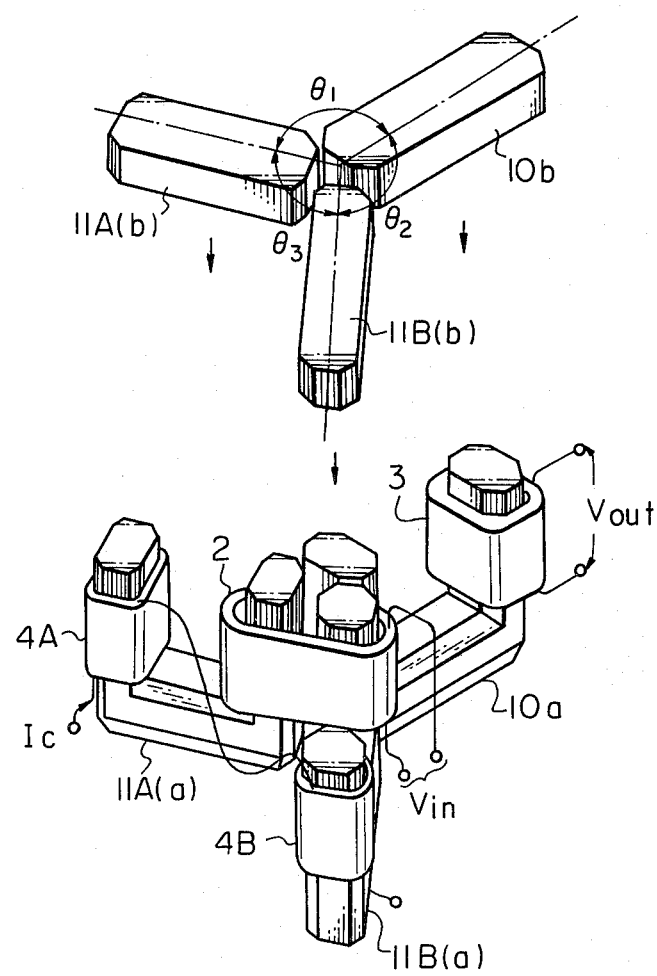
FIG. 10 shows still another structure of the transformer according to the present invention.
Figure 11:
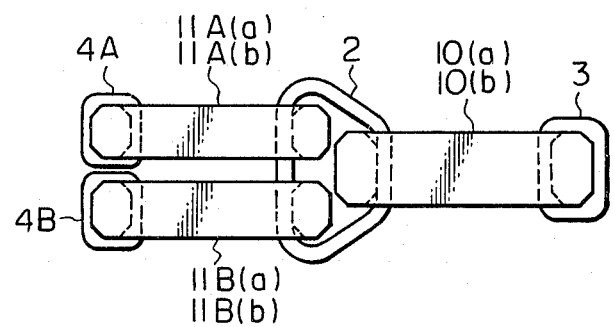
FIG. 11 and FIG. 12 are the modifications of the transformer shown in FIG. 10.
Figure 12:
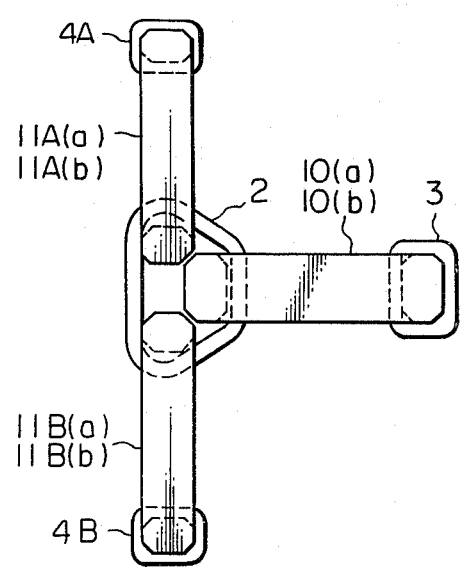

FIGS. 10, 11 and 12 show another embodiment of the magnetic core of the present transformer. In those figures, the main magnetic path is provided in the U shaped core 10a and I shaped core 10b, and a pair of sub-magnetic paths are provided in a pair of UI cores 11A(a) and 11A(b) and 11B(a) and 11B(b). The primary winding 2 is wound commonly on the first legs of each core (10(a), 11A(a), 11B(a)) and the secondary coil 3 is wound on the other leg of the core 10a. On the other legs of the cores 11A(a) and 11B(a), the control coils 4A and 4B are provided. The UI shaped cores 10a, 10b, 11A(a), 11A(b), 11B(a) and 11B(b) can be rotatably fixed around the leg around which the primary coil 2 is wound, so that the angles ($\theta_1$, $\theta_2$, $\theta_3$) between each core can be adjusted arbitrarily.

In should be appreciated that the transformer shown in FIGS. 10 through 12 performs the same operation as that in FIG. 6. Accordingly, when an input voltage $V_{in}$ is applied to the primary winding 2, the output voltage $V_{out}$ across the secondary coil 3 can be controlled by the control current $I_c$ in the control coils 4A and 4B. And it should be appreciated that a flat transormer can be obtained by arranging the angles between each core as shown in FIG. 11. Further, a transformer of the shape shown in FIG. 12 can be obtained by arranging the angles between each cores according to the condition of the available mounting space.

As explained above, the transformer shown in FIGS. 10 through 12 can take any shape according to the mounting position by changing the angles between each core, thus, effective use of the mounting space can be accomplished. And further, as the shape of all the cores is the same, the production of cores is simple. Although the embodiment in FIGS. 10 through 12 uses a UI shaped core, any core shape which can provide a closed magnetic path, including UU shaped core, can be utilized in the present embodiment.

Figure 13:
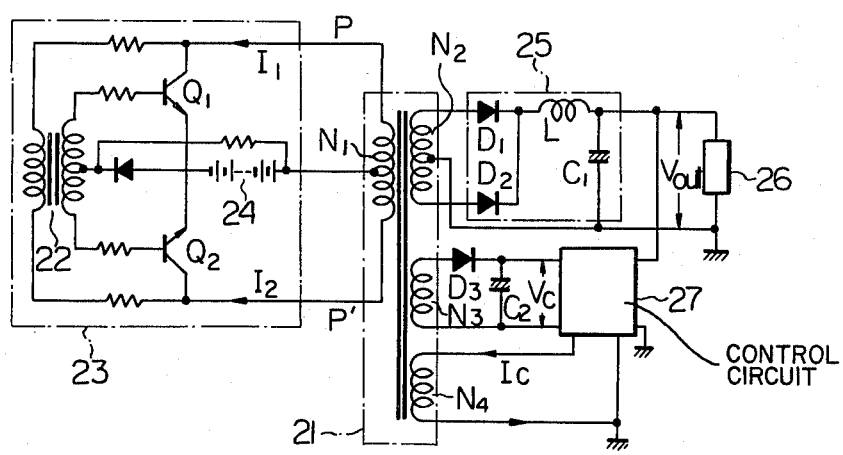
FIG. 13 is the circuitry of the stabilized power source using the present transformer.

FIG. 13 depicts the embodiment of the stabilized D.C. power source using the present transformer. In this drawing, the primary winding $N_1$ of the transformer 21 is a so-called bifilar coil with a center tap. To this primary winding $N_1$ is connected the self-exciting type push-pull converter 23 incorporating the transistors $Q_1$ and $Q_2$ connected to the push-pull converter as well as the oscillation transformer 22. And, the direct current power source 24 is connected between the center tap of the primary winding $N_1$ and the emitter of the transistors $Q_1$ and $Q_2$ so that the power is fed to the converter 23.

The secondary winding $N_2$ of the transformer 21 is also provided with a center tap. The full-wave rectification circuit 25 composed of the rectification diode $D_1$, $D_2$, reactor L and capacitor $C_1$, is connected to the secondary winding $N_2$. The DC output voltage $V_{out}$ of this full-wave rectification circuit 25 is fed to the load 26. The aforementioned pulse width control transformer 21 is equipped with the auxiliary supply winding $N_3$ and control winding $N_4$. The operation voltage $V_c$, AC output of the auxiliary supply winding $N_2$, rectified through rectification diode $D_3$ and capacitor $C_2$, is applied to the control circuit 27. The control circuit 27 detects changes in the aforementioned output voltage $V_{out}$ and controls the value of the control current $I_c$ to be fed to the control winding $N_4$.

It should be appreciated in FIG. 13 that the transformer 21 is a variable leakage transformer according to the present invention, and the push-pull convertor 23 provides the input voltage of the rectangular waveform to the primary winding $N_1$ of the transformer 21.

Figure 14:
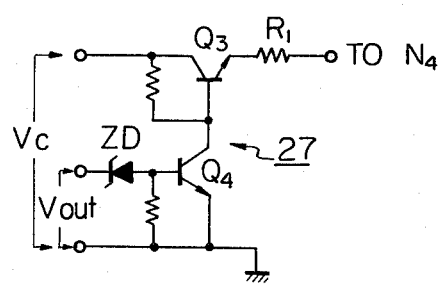
FIG. 14 is the embodiment of the circuitry of the control circuit and the power source in FIG. 13.

As illustrated in FIG. 14, the control circuit 27 is equipped with a series circuit consisting of, the transistor $Q_3$ which feeds control current $I_c$ to the control winding $N_4$, upon receiving the operation voltage $V_c$, the $V_c$ being rectified current of AC output of the aforementioned auxiliary supply winding $N_3$, and the resistor $R_1$. The control circuit also has the zener diode ZD that detects output voltage $V_{out}$ of the aforementioned full-wave rectification circuit 5, and the transistor $Q_4$ to be put into operation by ZD.

The above mentioned control circuit 27 lets the current pass through the transistor $Q_4$ by the break-down of the zener diode ZD when the output voltage $V_{out}$ exceeds the zener voltage of the zener diode ZD, and, reduces emitter current i.e. control current $I_c$ of the transistor $Q_3$.

Figure 15A:
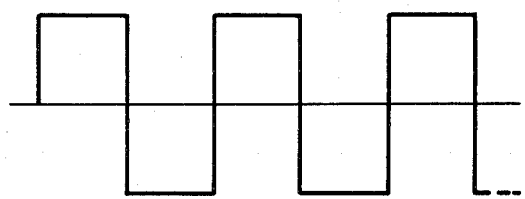
FIG. 15 shows the operational waveforms of the circuit shown in FIG. 13.
Figure 15B:
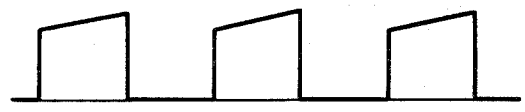
Figure 15C:
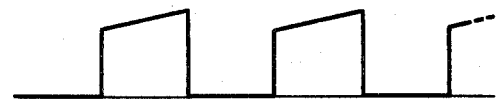
Figure 15D:
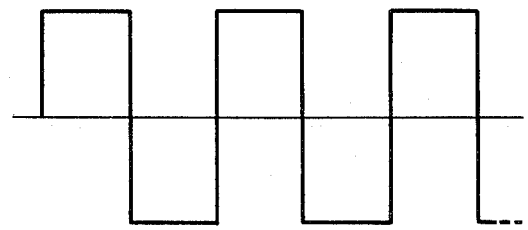

In the configuration of the FIGS. 13 and 14, if the sub-magnetic path of the transformer 21, is sufficiently saturated by having the prescribed control current $I_c$ passing through the control winding $N_4$, the sub-magnetic path becomes equivalent to non-existent. The P-P' voltage of the self-exciting push-pull type converter 23 assumes a rectangular wave form as indicated in FIG. 15(A). The collector current $I_1$ of the transistor $Q_1$ and the collector current $I_2$ of the transistor $Q_2$ assume wave forms as depicted in FIG. 15(B) and 15(C) respectively. Therefore, the voltage induced in the secondary winding $N_2$, as in the case of an ordinary transformer, becomes a rectangular wave form similar to that induced in the primary winding as shown in FIG. 15(D).

In this situation, transfer of power from the primary to the secondary becomes maximum and the output DC voltage $V_{out}$ also reaches its maximum value.

Figure 16A:
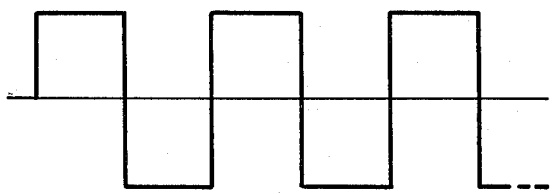
FIG. 16 shows the other operational waveforms of the circuit shown in FIG. 13.
Figure 16B:
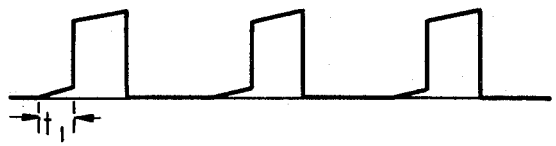
Figure 16C:
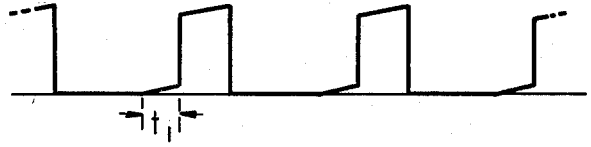
Figure 16D:
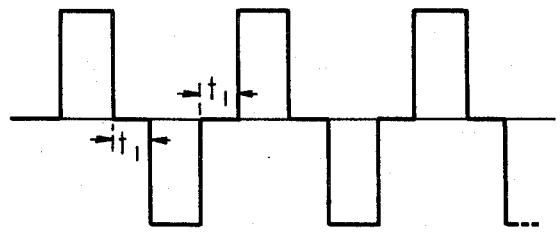

When the terminal voltage of the DC power source 24 rises, or the load 26 decreases resulting in an increase in the output DC voltage $V_{out}$, the current flows through the zener diode ZD in the control circuit 27 and the base bias cirrent of the transistor $Q_3$ is divided by the transistor $Q_4$. As a result, emitter current of the transistor $Q_3$, i.e. control current $I_c$ decreases and the magnetic reluctance of the magnetic core, of the sub-magnetic path of the transformer 21, drops. Then, most of the magnetic flux generated by the primary winding $N_1$ flows to the sub-magnetic path and reduces the coupling with the secondary winding $N_2$. Therefore, even if the P-P' voltage of the self-exciting push-pull type converter 23 assumes the rectangular wave form indicated in FIG. 16(A), the collector current $I_1$ of the transistor $Q_1$ and the collector current $I_2$ of the transistor $Q_2$ assume wave forms aw shown in FIG. 16(B) and 16(C) respectively. That is, until the time $t_1$ when the sub-magnetic path has been magnetically saturated by the magnetic flux established by the primary winding $N_1$, only very little current corresponding to the exciting current for exciting the magnetic core of the transformer 21, flows as collector current of each transistor. After a period of time $t_1$, the sub-magnetic path is saturated and the magnetic flux of the primary winding $N_1$ couples with the secondary winding $N_2$. Therefore, the voltage appearing in the secondary winding $N_2$ becomes a bipolar type pulse such as shown in FIG. 16(D). That is, compared with the FIG. 15(D) the pulse width becomes shorter by as much as the time duration $t_1$ and therefore, in response thereto the output DC voltage $V_{out}$ drops.

Thus, in the embodiment of FIG. 13, the output DC voltage $V_{out}$ can be constantly maintained at a given level, if the control current $I_c$ and the characteristics of the zener diode ZD are appropriately set contingent upon the output DC voltage $V_{out}$ desired. In this situation, the collector currents of the transistors $Q_1$ and $Q_2$ of the aforementioned converter become only exciting current at the time $t_1$, and the output end of the converter 23 reaches an open circuit or no-load condition. Therefore, the control does not cause a power loss, while conversion efficiency of the converter 23 scarcely decreases. In the conventional pulse control system, in order to control operation of a switching element, a feed back circuit from the secondary to the primary of the transformer is necessary. However, according to the above embodiment, pulse width control can be accomplished on the secondary side of the transformer 21, and the primary is irrelevant to the control. Therefore, a high dielectric strength as prescribed by various safety standards can be readily provided between the primary and the secondary. Further, since a complex circuit arrangement is not required, a cost reduction opportunity is available.

Figure 17:
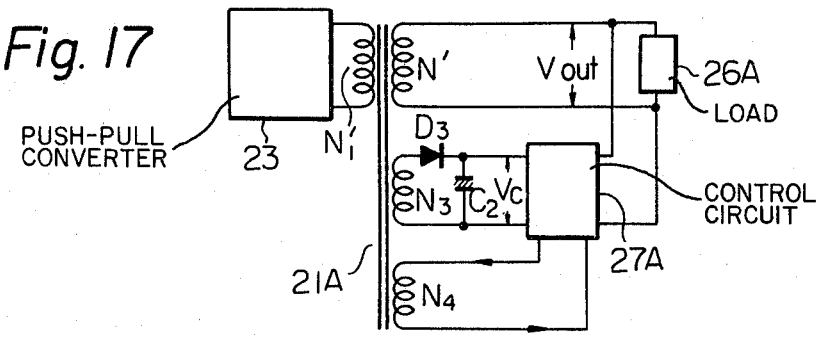
FIG. 17 is the circuit of another stabilized power source using the present transformer.

The embodiment described above depicted application in a situation where stable output DC voltage is supplied to the load. The another embodiment is given in FIG. 17, where the load generated by lamps and heaters is directly driven by AC current. In this figure, the output of the converter 23 is applied to the primary winding $N_1$ of the transformer 21A, and the load 26A is connected to the secondary winding $N_2$ of the transformer 21A. The AC output of the auxiliary supply winding $N_3$ of the transformer 21A is rectified by the rectification diode $D_3$ and the capacitor $C_2$. This operational voltage $V_c$ is then supplied to the control circuit 27A. The control circuit 27A detects the changes in the bipolar-type pulse output AC voltage $V'_{out}$ applied to the load 26A, and controls the value of the control current $I_c$ to be fed to the control winding $N_4$.

Figure 18:
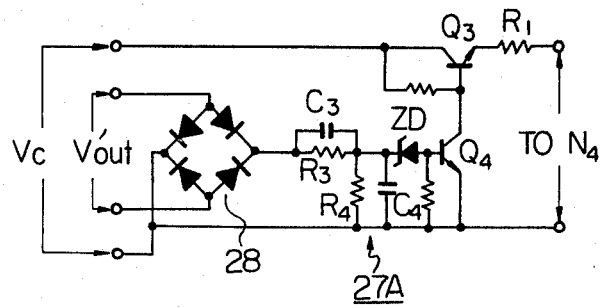
FIG. 18 is the circuit of the control circuit of the power source in FIG. 17.

In addition to the configuration of the control circuit 27 depicted in FIG. 13, the control circuit 27A, as shown in FIG. 18, is provided with the 1'st series circuit composed of the bridge rectifier 28, capacitor $C_3$ and the resistor $R_3$ as well as the second series circuit composed of the capacitor $C_4$ and the resistor $R_4$. With this arrangement, the DC value, directly proportional to the effective value of the output AC voltage $V_{out}$, is output at both ends of the 2'nd series circuit and is applied to the zener diode ZD. That is, the control circuit 27A applies to the control winding $N_4$ the control current $I_c$ that corresponds to the effective value of the output AC voltage $V'_{out}$.

With respect to the embodiment mentioned above, the effective value of the output AC voltage $V'_{out}$ can be constantly maintained at a given level if the characteristics of each element, the control current $I_c$ etc., in the control circuit 27A are appropriately set with close correlation to the desired output AC voltage $V'_{out}$. Thus, the performance is similar to the embodiment in FIG. 13.

So far, description of the operation has been concerned with situations where a single stabilized output is to be obtained. There are situations where multiple outputs are required and each of the outputs must be independently stabilized.

Figure 19:
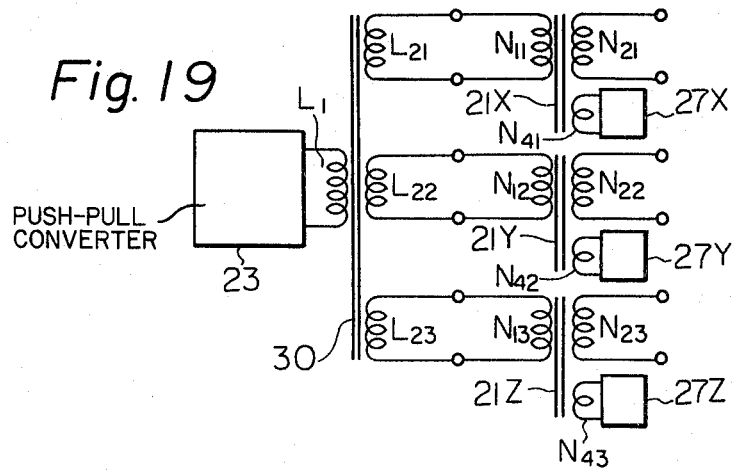
FIG. 19 is the circuit of still another stabilized power source using the present transformer.

FIG. 19 is another embodiment of this invention with a configuration appropriate to the above situation. In this figure, output of the converter 23 is applied to the primary winding $L_1$ of the output transformer 30 provided with the required numbers of output windings. And, to each of the output windings $L_{21}$, $L_{22}$ and $L_{23}$ is connected each of the primary windings $N_{11}$, $N_{12}$ and $N_{13}$ respectively of the control transformers 21X, 21Y and 21Z respectively. Each of the control windings $N_{41}$, $N_{42}$ and $N_{43}$ of the control transformers 21X, 21Y and 21Z respectively is provided with the control circuits 27X, 27Y and 27Z respectively. With these control circuits, the control of the output pulse width of the secondary windings $N_{21}$, $N_{22}$, $N_{23}$ of the control transformers 21X, 21Y and 21Z respectively is effected: i.e. regulation of output voltage is accomplished.

According to the configuration described in FIG. 19 above, a single converter 23 can be used for each stabilized output in common. Compared with a situation where a converter is provided for each regulated output, this arrangement greatly simplifies the circuit configuration and, therefore, is less costly. Further, the transformer 30 can be removed. In that case, the parallel connection of primary windings $N_{11}$, $N_{12}$, $N_{13}$ is connected directly to the output of the converter 23.

As described above, with these embodiments, output pulse width is controlled by the control transformer. Therefore, the oscillation frequency of the converter can be arbitrarily set to meet the current demand. This facilitates the design of the converter. At the same time, control of the operation of the switching element in the converter is unnecessary. Since the feedback circuit from the secondary to the primary of the transformer is unnecessary, insulation between the primary and the secondary is facilitated. Special contrivances for a feedback circuit are not necessary either. The circuit arrangement is simple while affording economical improvement.

The converter can be a self-exciting push-pull type, a blocking oscillator type with a single transistor, separately excited converter, etc., or a converter incorporating a transistor or thyristor as the switching element. If multiple regulated output are desired, the control transofrmers may be connected in parallel to a single converter.

As detailed above, this invention provides a high performance regulated power supply device of a simple configuration incorporating the control transformer.

From the foregoing it will now be apparent that a new and improved transformer and a stabilized power source using the transformer have been found. It should be understood of course that the embodiments disclosed are merely illustrative and are not intended to limit scope of the invention. Reference should be made to the appended claims, therefore, rather than the specification as indicating the scope of the invention.

What is claimed is:

1. A variable leakage transformer, comprising:
first, second and third magnetic core pieces, each forming a closed magnetic path and having a common leg and another leg,
said common legs being in mutual juxtaposition, with each of said core pieces being rotatable about the common leg thereof,
a primary winding wound about said juxtaposed common legs of said core pieces,
a secondary winding wound about the other leg of said first core piece,
a control winding wound about at least one of the other legs of said second and third core pieces, and
means coupled to said control winding for controlling the magnetic flux in said common leg of said first core piece.

* * * * *

UNITED STATES PATENT OFFICE
CERTIFICATE OF CORRECTION

Patent No. 4,213,084      Dated July 15, 1980

Inventor(s) Hirayama Hiromitsu

It is certified that error appears in the above-identified patent and that said Letters Patent are hereby corrected as shown below:

Column 1, lines 22 and 25: "controlable" should be --controllable--.

Column 5, line 13: "commond" should be --common--.

Column 7, line 22: "cirrent" should be --current--.

Column 9, lines 21 - 22: "transofrmers" should be --transformers--.

Signed and Sealed this

Twenty-third Day of December 1980

[SEAL]

Attest:

SIDNEY A. DIAMOND

*Attesting Officer*     *Commissioner of Patents and Trademarks*